W. EICHNER.
SACKING DEVICE.
APPLICATION FILED NOV. 11, 1909.
1,009,899.
Patented Nov. 28, 1911.
2 SHEETS—SHEET 2.
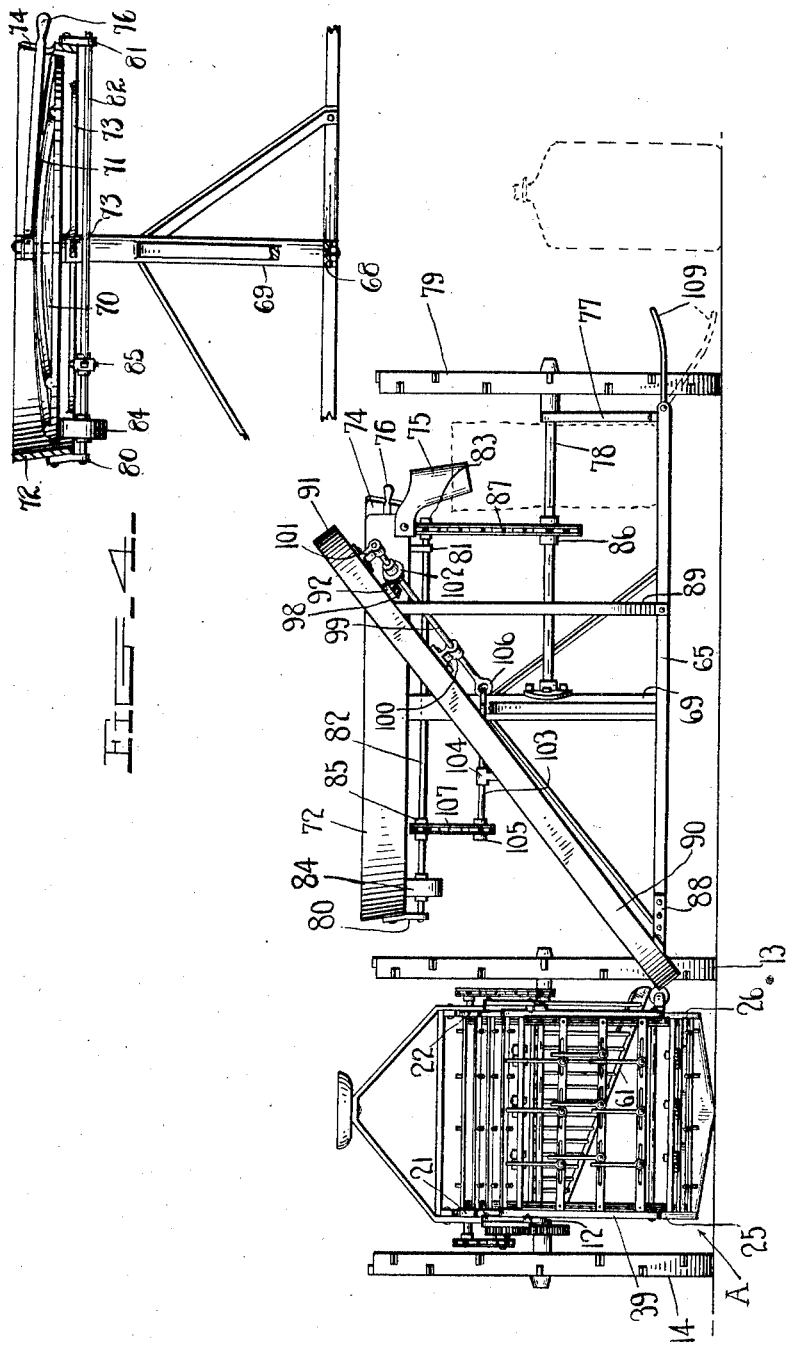
Witnesses
L. B. James
Henry T. Bright
Inventor
William Eichner
By [signature]
Attorneys

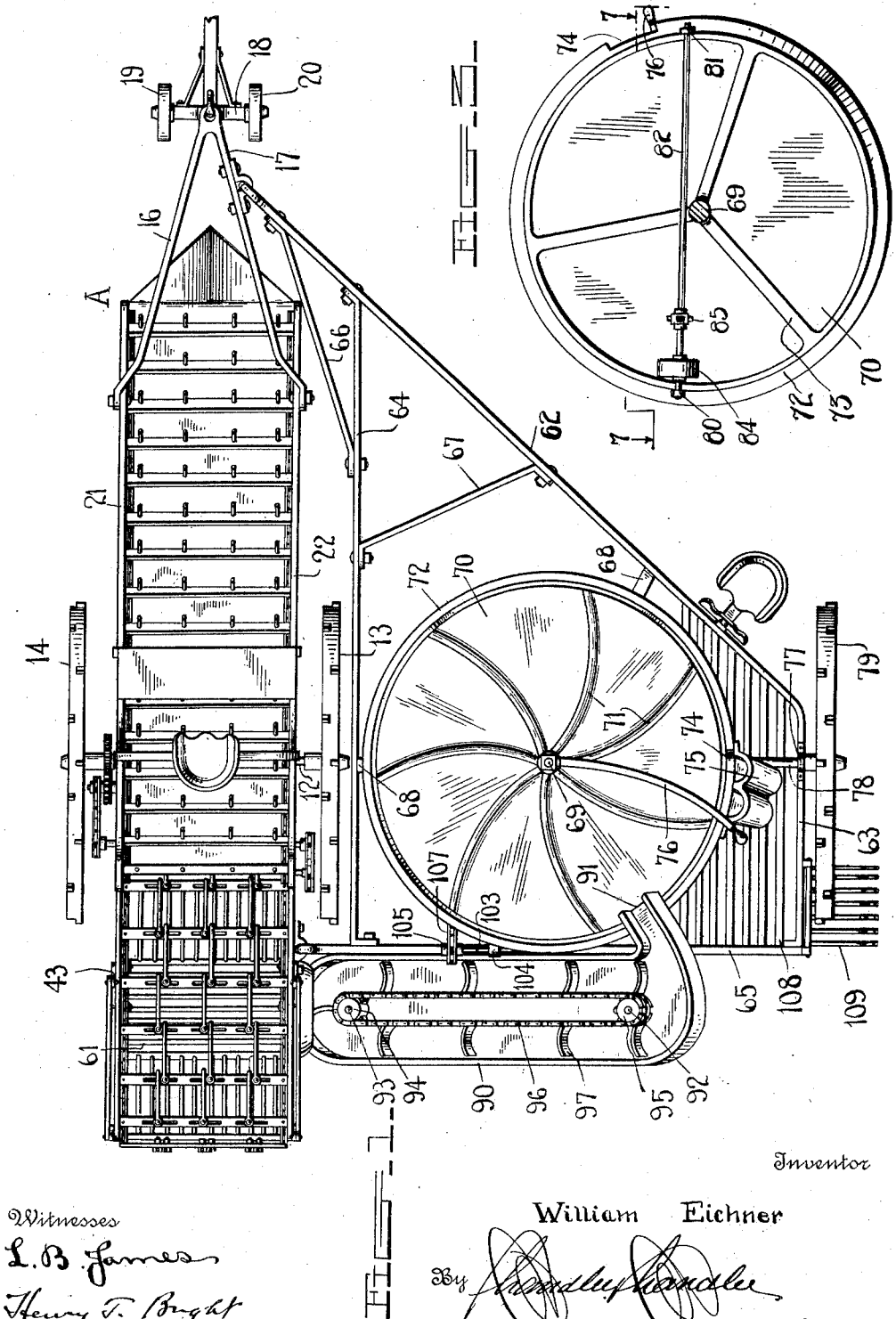

UNITED STATES PATENT OFFICE.

WILLIAM EICHNER, OF WALCOTT, IOWA.

SACKING DEVICE.

1,009,899.

Specification of Letters Patent.   Patented Nov. 28, 1911.

Application filed November 11, 1909. Serial No. 527,440.

*To all whom it may concern:*

Be it known that I, WILLIAM EICHNER, a citizen of the United States, residing at Walcott, in the county of Scott, State of Iowa, have invented certain new and useful Improvements in Sacking Devices; and I do hereby declare the following to be a full, clear, and exact description of the invention, such as will enable others skilled in the art to which it appertains to make and use the same.

This invention relates to sacking mechanisms and particularly to that type utilized in sacking potatoes.

The object of the invention resides in the provision of a sacking mechanism of the type named, which will be efficient in use, simple in construction, and which is capable of receiving its feed from any suitable source.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a plan view of the sacking mechanism, showing the same associated with a potato digging apparatus, from which it is adapted to receive its feed; Fig. 2, a rear view of what is shown in Fig. 1; Fig. 3, a bottom plan view of the rotatable disk of the sacking mechanism and associated parts; and, Fig. 4, a section on the line 7—7 of Fig. 3.

Referring to the drawings, A represents generally a digging apparatus, which is adapted to deliver to the sacking mechanism to be hereinafter described. This digging apparatus includes a frame formed of inclined spaced parallel side members 21 and 22, which are supported at their upper ends upon an axle 12, upon opposite ends of which are journaled traction wheels 13 and 14. The lower ends of the side members 21 and 22 are supported by the rear ends of arms 16 and 17 of a V shaped frame, the common forward end of said arms being pivotally connected to and sustained by an axle 18 provided with wheels 19 and 20. Supported by the side bars 21 and 22 respectively are horizontal side bars 25 and 26, and mounted upon these horizontal side bars 25 and 26 at their rear ends is a hopper 61, which is adapted to deliver to the sacking mechanism.

The sacking mechanism of the machine is disposed to one side of the digging apparatus, the same being supported upon a flexible frame which is formed of the rearwardly inclined front members 62 having one end linked to the arm 17, and the other end bent rearwardly to form the outer side member 63 of the supporting frame of the sacking mechanism, said frame being completed by the inner side member 64 and the rear side member 65; which latter is linked at its inner end to the side bar 26. Additional stanchness is given to the supporting frame of the sacking mechanism by the braces 66 and 67. Having one end connected to the front member 62 and the other end to the member 64, is a cross bar 68, which supports intermediate its ends a standard 69. Horizontally disposed and rotatably mounted upon the upper end of the standard 69 is a circular disk 70, which constitutes a part of the delivery element of the sacking mechanism, said disk being depressed circumferentially and provided on its upper face with a series of radially disposed correspondingly curved arms or ribs 71. Positioned around the disk 70 and secured in a fixed manner to the standard 69 through the medium of the spiders 73 is an annular wall 72, provided with an opening 74 therethrough, and carrying a tubular spout 75 in registry with said opening. Disposed within the wall 72 and having one end pivoted to the upper end of the standard 69 is a curved arm 76 arranged in opposition to the ribs 71 and adapted to be adjusted across the tubular mouth of the spout 75.

Supported upon the side members 63 is an upright journal bracket 77, through the upper end of which passes an axle 78, the inner end of said axle being journaled to the standard 69 in any suitable manner and, the outer end thereof being provided with a supplementary traction wheel 79, which supports the outer end of the sacking mechanism frame. Passing through the standard 69 and having its ends supported in the brackets 80 and 81 is a shaft 82 which carries at its outer end a sprocket wheel 83 and at its inner end a friction wheel 84, while another sprocket wheel 85 is carried by said shaft intermediate the friction wheel 84 and the standard 69. Mounted on the shaft 78 is a sprocket wheel 86 in line with the sprocket wheel on the shaft 82, and a sprocket chain 87 is mounted for travel on the sprocket wheels 86 and 83. Carried by brackets 88 and 89 secured to the rear member 65 of the frame is an inclined trough 90, the lower end of which projects beneath the delivery end of the hopper 61. The upper end of said trough terminates in a tangentially disposed spout 91, which is positioned to deliver upon the disk 70 and within the wall 72. Journaled in the bottom of the trough 90 transversely thereof and extending on each side of said bottom are shafts 92 and 93; the shaft 92 being located at the top and the shaft 93 at the bottom thereof. Mounted on the portion of the shaft 93, and disposed within the trough, is a sprocket wheel 94, while a corresponding sprocket wheel 95 is similarly mounted on the shaft 92. A sprocket chain 96 travels on the sprocket wheels 94 and 95 and has secured thereto at equal intervals laterally disposed curved wings 97 which are adapted during the movement of the chain 96 to lift the potatoes delivered to the trough 90 and effect their delivery through the spout 91 on to the disk 70. Mounted on the shaft 92 beneath the bottom of the trough 90 is a bevel gear 98, while a shaft 99 disposed diagonally across the bottom of the trough 90 and supported by brackets 100 and 101, carries a bevel gear 102, which meshes with the bevel gear 98. Another shaft 103 is journaled in a bracket 104 secured to the trough 90 and has one end thereof provided with a sprocket wheel 105 and its other end operatively connected to the shaft 99 through the medium of a universal joint 106. A sprocket chain 107 is mounted upon the sprocket wheels 85 and 105. From the construction just described, it will be apparent that when the axle 78 is rotated by the traction wheels 79 during the movement of the machine over the ground, a corresponding rotation will be imparted to the shaft 82 and shafts 99 and 103 by reason of the various connections therebetween. Rotation of the shaft 82 will, by reason of the engagement between the friction wheel 84 and the disk 70, rotate said disk, while rotation of the shaft 99 will actuate the endless chain 96 by reason of the operative engagement between the bevel gears 98 and 102. The extreme outer end of the frame which supports the sacking mechanism is provided with a flooring 108, upon which suitable attendants may stand, and projecting outwardly from the side member 63 is a pivoted carrier 109 by which the sacks may be deposited upon the ground after the fashion of a harvester binder by the actuation of a suitable hand lever.

It will be noted that by adjusting the curved arm 76 to a position between the mouths of the tubular spout 75, the delivery of potatoes will be restricted to one of the mouths of said spout and when said arm is disposed as shown in Fig. 1, the potatoes will be forced through both of the mouths of said spout. It will be equally obvious that by reason of the opposite disposition of the ribs 71 and the arm 76, a wedging effect will be produced by the rotation of the disk 70, which will positively tend to force the potatoes into the mouth or mouths of the spout 75.

What is claimed is:—

1. In a device of the class described, the combination of a frame, a standard mounted on said frame, a disk rotatably mounted on the upper end of said standard and having a convexed upper face having a continuous curve from its center to its periphery, a plurality of radially disposed ribs on the upper face of said disk, a fixed wall surrounding said disk, a spout supported by said wall and opening therethrough and means for rotating the disk.

2. In a device of the class described, the combination of a frame, a standard mounted on said frame, a disk rotatably mounted on the upper end of said standard and having the upper face thereof provided with a plurality of corresponding curved radially disposed ribs, a fixed wall surrounding said disk, a spout having a plurality of mouths mounted on the wall and opening therethrough, an arm mounted on the upper end of the standard within the wall surrounding said disk, said arm being of curved formation opposite to the ribs of the disk, means for adjusting said arm from one position to another with respect to the wall, and means for rotating the disk.

In testimony whereof, I affix my signature, in presence of two witnesses.

WILLIAM EICHNER.

Witnesses:
  JOHN H. STROHBEAU,
  R. BENNEWITZ.

Copies of this patent may be obtained for five cents each, by addressing the "Commissioner of Patents, Washington, D. C."